United States Patent [19]

Noe

[11] Patent Number: 5,595,665
[45] Date of Patent: Jan. 21, 1997

[54] PROCESS VESSEL HEAD FLUSH APPARATUS

[75] Inventor: Robert J. L. Noe, Mt. Prospect, Ill.

[73] Assignee: UOP, Des Plaines, Ill.

[21] Appl. No.: 439,801

[22] Filed: May 12, 1995

Related U.S. Application Data

[62] Division of Ser. No. 65,968, May 25, 1993, Pat. No. 5,415,773.

[51] Int. Cl.⁶ ........................................ C02F 1/42
[52] U.S. Cl. .................. 210/662; 210/670; 210/264; 210/284; 210/291; 210/660; 210/739
[58] Field of Search ................................. 210/283, 670, 210/198.2, 284, 291, 264, 662, 739

[56] References Cited

U.S. PATENT DOCUMENTS

| | | | |
|---|---|---|---|
| 2,763,607 | 9/1956 | Staverman | 210/685 |
| 2,789,696 | 4/1957 | Jahnig et al. | 210/274 |
| 2,985,589 | 5/1957 | Broughton et al. | 210/34 |
| 3,789,989 | 2/1974 | Carson | 210/284 |
| 4,378,292 | 3/1983 | Haase | 210/284 |
| 4,623,466 | 11/1986 | Savall | 210/268 |
| 4,705,627 | 11/1987 | Miwa et al. | 210/264 |
| 4,999,102 | 3/1991 | Cox et al. | 210/284 |
| 5,156,736 | 10/1992 | Schoenrock | 210/283 |
| 5,200,075 | 4/1993 | Otani et al. | 210/283 |
| 5,316,821 | 5/1993 | Otani et al. | 210/283 |
| 5,415,773 | 5/1995 | Noe | 210/264 |

*Primary Examiner*—Cynthia L. Nessler
*Attorney, Agent, or Firm*—Thomas K. McBride; John G. Tolomei

[57] ABSTRACT

A head flush apparatus for a pressure vessel uses an equalization chamber that channels the fluid generated by the head flush into a low volume chamber and withdraws fluid from the pressure vessel through the low volume chamber. Withdrawing fluid generated by the head flush and channeling the fluid through the low volume chamber reduces or eliminates the circulation of fluid between the equalization chamber and the adjacent process chamber and minimizes the amount of contamination that can result from any circulation of fluid resulting from pressure fluctuations. The withdrawal of fluid through the low volume chamber also provides a non-contaminating path for withdrawing leakage from the vessel.

2 Claims, 2 Drawing Sheets

PROCESS VESSEL HEAD FLUSH APPARATUS

CROSS REFERENCE TO RELATED APPLICATIONS

This application is a divisional application of U.S. Ser. No. 065,968 filed May 25, 1993, now U.S. Pat. No. 5,415,773.

BACKGROUND OF THE INVENTION

1. Field of the Invention

This invention relates generally to the process vessels having internal partitions. More specifically this invention relates to an apparatus and method for flushing an isolated end closure while balancing pressure across an internal partition that isolates the end closure.

2. Description of the Prior Art

Pressure vessels that contain particulate material for contacting fluids such as gas or liquid process streams are standard features of the chemical and refining industries. Internal partitions often subdivide the interior of the a pressure vessel into different chambers to permit staged or multiple contacting operations within a single pressure vessel. These partitions routinely take the form of or are used in conjunction with collection or distribution grids. Process requirements, such as the collection and distribution of fluids, regularly dictate the employment of relatively flat partitions.

As pressure vessels become large, the need for flat partitions create a number of mechanical problems. A differential pressure across a flat partition of as little as 2 psi or less can cause structural damage across the partition. Structural damage to the partitions has the potential to create leaks across the partition or in associated distribution/collection piping. Such leaks typically contaminate the zones created by the partition. As a result those designing partitions or grids seek to balance pressure across grids or partitions.

Aside from partition loads, pressure in large vessels affects the vessel configuration. Concave end closures or "heads" present at the ends of the pressure vessel provide the most practical means for closing the ends of a large vessel. Full diameter flat partitions cannot fit into the rounded head. The incompatible geometry between the rounded head and the flat partitions prevent full utilization of the head volume for process purposes. Nevertheless, maintaining structural integrity of the end grid demands pressure balancing between the head volume and the adjoining volume on the opposite side of the partition. In addition, the volume of the head represents a non-process or dead volume, i.e. a volume excluded from the normal process flow stream. Dead volumes can lead to vessel or process deterioration from corrosion, condensation, solidification or contamination.

Dead volumes ordinarily receive a purge or flush stream to keep the area active and avoid the aforementioned problems. The volume of the head serves as an equalization chamber. A small opening or port in the partition communicates fluid from the equalization chamber into the operational process chamber on the opposite side of the partition. In many processes the channeling of fluid from the equalization chamber to a process chamber hinders process performance.

A simulated moving bed adsorbent process exemplifies a process that regularly uses multiple partitions in relatively large pressure vessels. U.S. Pat. No. 2,985,589, the contents of which are hereby incorporated by reference, describes the moving bed adsorbent process in detail. The process distributes and collects process streams from multiple chambers of adsorbent defined by internal partitions located within a pressure vessel and arranged as distribution/collection grids. Periodic shifting of the input and effluent streams over the chambers simulates movement of the adsorbent and permits delivery or withdrawal of the streams with a desired concentration profile. Delivering or withdrawing the streams requires flat distribution grids.

Flat distribution grids and concave end closure heads in the simulated moving bed process again result in a non-process volume above or below the end grids in the vertical adsorbtion chamber. A small flow of a flush fluid, usually comprising a desorbent material, flushes the head and passes out of the head through a grid opening into the adjacent adsorbent bed. Proper selection of the flush fluid ordinarily prevents contamination of the streams entering or leaving the adjacent bed. However, leakage of a process stream into the head volume can cause the flush fluid to carry contaminants into the bed.

In the absence of leakage, the addition of the flush fluid can still reduce maximum recovery from the adsorbent bed and interfere with the maximization of purity and recovery. The addition of desorbent to the adsorbent bed can reduce recovery by taking up adsorbent capacity. Maintaining a low flush flow rate causes circulation of fluid between the equalization and process chamber as pressure fluctuations within the pressure vessel pump fluids across the grid opening. Circulation of fluid between equalization and process chambers can contaminate the process chamber.

More importantly, the addition of desorbent hinders an accurate accounting of flow through the adsorbent beds. In the usual case of a liquid system, one effluent stream from the system floats on pressure control while flow controllers regulate the flow rate of the other input and effluent streams. The fast pressure response time of a liquid full system renders a complete flow control of all input and output stream impractical. Thus as several head flush stream enter the system, the cumulative effect of these streams throws off the fluid flow calculation for a given zone which tends to move the process away from optimum conditions. The common use of multiple vessels to contain multiple the absorbent beds and the resulting additional head flushes amplifies the difficulty of maintaining peak flow conditions.

It is an object of this invention to provide a pressure vessel capable of operating with flat partitions or grids that reduces or eliminates the problem associated with a head flush.

It is a yet further object of this invention to improve the operation of simulated moving bed adsorption process.

BRIEF DESCRIPTION OF THE INVENTION

This invention is a head flush apparatus and process for a pressure vessel having an equalization chamber that channels the fluid generated by a head flush into a low volume chamber and withdraws fluid from the pressure vessel through the low volume chamber. Withdrawing fluid generated by the head flush and channeling the fluid through the low volume chamber reduces or eliminates the circulation of fluid between the equalization chamber and the adjacent process chamber and minimizes the amount of contamination that can result from any circulation of fluid resulting from pressure fluctuations. The withdrawal of fluid through the low volume chamber also provides a non-contaminating path for withdrawing leakage from the equalization chamber of the vessel.

The constant withdrawal of head flush fluid through the low volume chamber ordinarily keeps the composition of the fluid near the opening in the partition between the equalizing chamber and the process chamber approximately the same as that of the entering head flush. In addition, the withdrawal of fluid from the low volume chamber also serves to quickly remove contamination from the grid thereby eliminating a source of contamination to subsequent process steps. Therefore, any fluid that does pass through the partition will pose minimal contamination problems.

The use of this apparatus and process can improve the compositional control of a process stream passing into or withdrawn from a processing chamber as well as increasing the contacting capacity of a particulate material contained in the processing chamber. For an adsorption process, compositional control and increased contacting capacity translates into higher recoveries and purities of the product streams.

Accordingly in one embodiment this invention is an apparatus comprising a vessel and partition arrangement for confining fluids. The apparatus comprises a process vessel and a first partition subdividing the vessel into at least a first and a second chamber. A second partition defines at least a portion of a third chamber having a smaller volume than the first and second chambers and the third chamber defines at least a portion of a fluid flow path for fluid communication between the first and second chambers. The apparatus also includes means for adding a flush fluid to the second chamber and means for withdrawing a flush stream from the third chamber.

In another embodiment this invention is a simulated moving bed adsorption process. The process comprises: collecting or distributing a process flow stream through a distribution grid in an adsorption vessel; passing a head flush fluid to an equalization chamber in the adsorption vessel; establishing fluid communication between the equalization chamber and the distribution grid in a flush chamber; and, withdrawing a flush chamber effluent comprising head flush fluid from the head flush chamber.

Additional objects, embodiments, and details of the invention are set forth in the following derailed description of the invention.

DETAILED DESCRIPTION OF THE INVENTION

Figure 1:
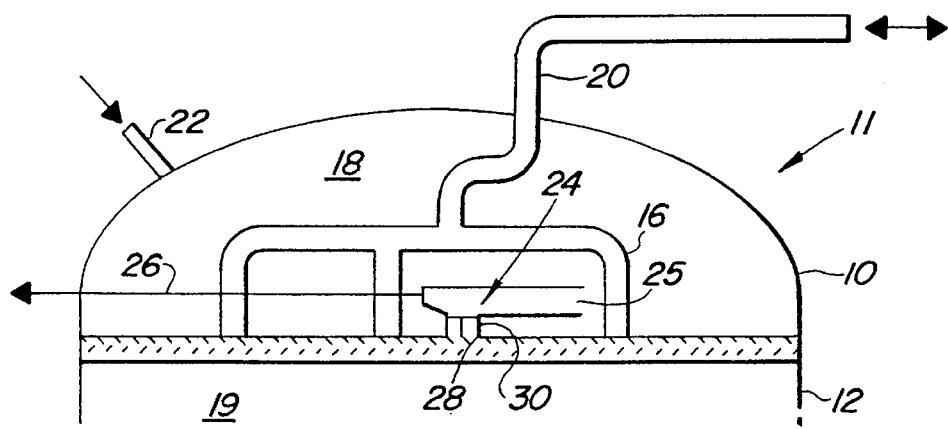
FIG. 1 is a partial cross section of a process vessel having the end closure, partition and the low volume chamber of this invention.

FIG. 1 illustrates a basic arrangement for the apparatus of this invention. Referring then to FIG. 1 a top head 10 having an elliptical configuration closes the upper end of a cylindrical shell 12 that together form the upper end of a pressure vessel 11. Head 10 and shell 12 surround a partition in the form of a distribution grid 14 that receives and collects fluid through manifold piping 16. An equalization chamber 18, defined by grid 14 and head 10, contain piping 16. A process line 20 transfers fluid to or from grid 14. The underside of the grid 14 and shell 12 define process chamber 19 opposite chamber 18.

Head flush fluid enters equalization chamber 18 through nozzle 22. A small volume chamber 24, referred to as the flush chamber, receives fluid containing head flush from chamber 18 through an inlet 25. Opposite inlet 25 chamber 24 has a grid port 28 that communicates fluid between grid 14 and chamber 24. A head flush stream comprising fluid from equalization chamber 18 with the addition of any fluid from grid 14 or the subtraction of any fluid into grid 14 leaves chamber 24 and pressure vessel 11 through line 26.

In normal operation process streams enter and leave process chamber 19 through grid 14 and piping 16, 20 with minimal exchange of fluid across port 28. The only exchange of fluid occurs as small pressure or flow variations cause minor amounts of fluid to pass across port 28. The amounts of fluid exchanged between the grid and flush chamber usually comprises less than about 0.2 to 0.02% of the average flow of process fluid through line 20. Typically the volume of fluid circulated between the grid and the flush chamber or manifold will not exceed a small volume 30 located between the port 28 and the inlet to line 26.

Flush chamber volume will depend on a number of variables. Such variables include the volumetric rate of flush fluid entering the equalization chamber; the flexibility of the partition, the range of pressure fluctuations in the vessel, and the time required for each step of the process. In most cases the flush chamber volume will not exceed 0.5% of the equalization chamber (i.e. top or bottom head) volume. More typically, flush chamber volume will be less than or equal to 0.2% of the equalization chamber volume. Commonly the flush chamber will have sufficient cross sectional area to prevent the maximum differential pressure on the partition due to the flow across the partition from exceeding the maximum permissible differential pressure loading for the partition.

Figure 2:
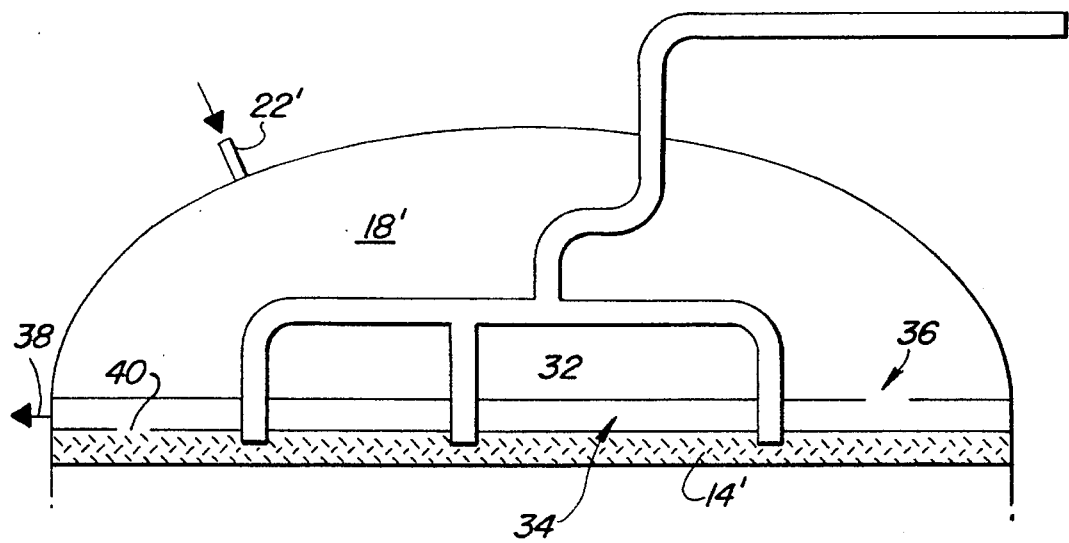
FIG. 2 is a cross section showing an alternate arrangement for the low volume chamber of this invention.

A variety of flush chamber configurations can fulfill the flush chamber function. FIG. 1 depicts the flush chamber in the form of a conduit. FIG. 2 presents an alternate configuration for the flush chamber. In FIG. 2 an upper partition 32, together with a grid 14', define a flush chamber 34 in the form of a cylindrical segment. Flush fluid enters an equalization chamber 18' through a nozzle 22'. A port 36 withdraws flush fluid from the equalization chamber 18' and into flush chamber 34. Line 38 evacuates flush fluid from chamber 34. A port 40 establishes fluid communication between grid 14' and chamber 34.

In most cases the flow of head flush into the equalization chamber approximately balances the flow of head flush stream out of the flush chamber. The passing of slight amounts of fluid into or out of the grid may improve operation of the process in certain cases. For example, allowing a slight amount of net fluid flow from the flush chamber into the grid space will eliminate fluid being left behind by a preceding process step that can contaminate a subsequent process step. A very slight amount of fluid flow will prevent contamination. These small process flows have a little to no effect on process recoveries. Similarly, where a leak develops, such as in manifold piping 16, permitting a small net flow out of the grid into the flush chamber halts any contaminating flow of fluid from the equalization chamber into the grid at the cost of an insignificant process fluid loss.

The vessel arrangement and process of this invention can benefit new or existing processes that use a pressure equalized partition to separate a volume into chambers and allows communication of fluid across the partition. Applicable processes can operate with liquid, gas, or mixed phase conditions. This invention provides the maximum benefit with liquid phase conditions. Such processes generally include adsorptive or catalytic processes. A particularly preferred process for the practice of this invention is the previously described simulated moving bed adsorption process.

Figure 3:
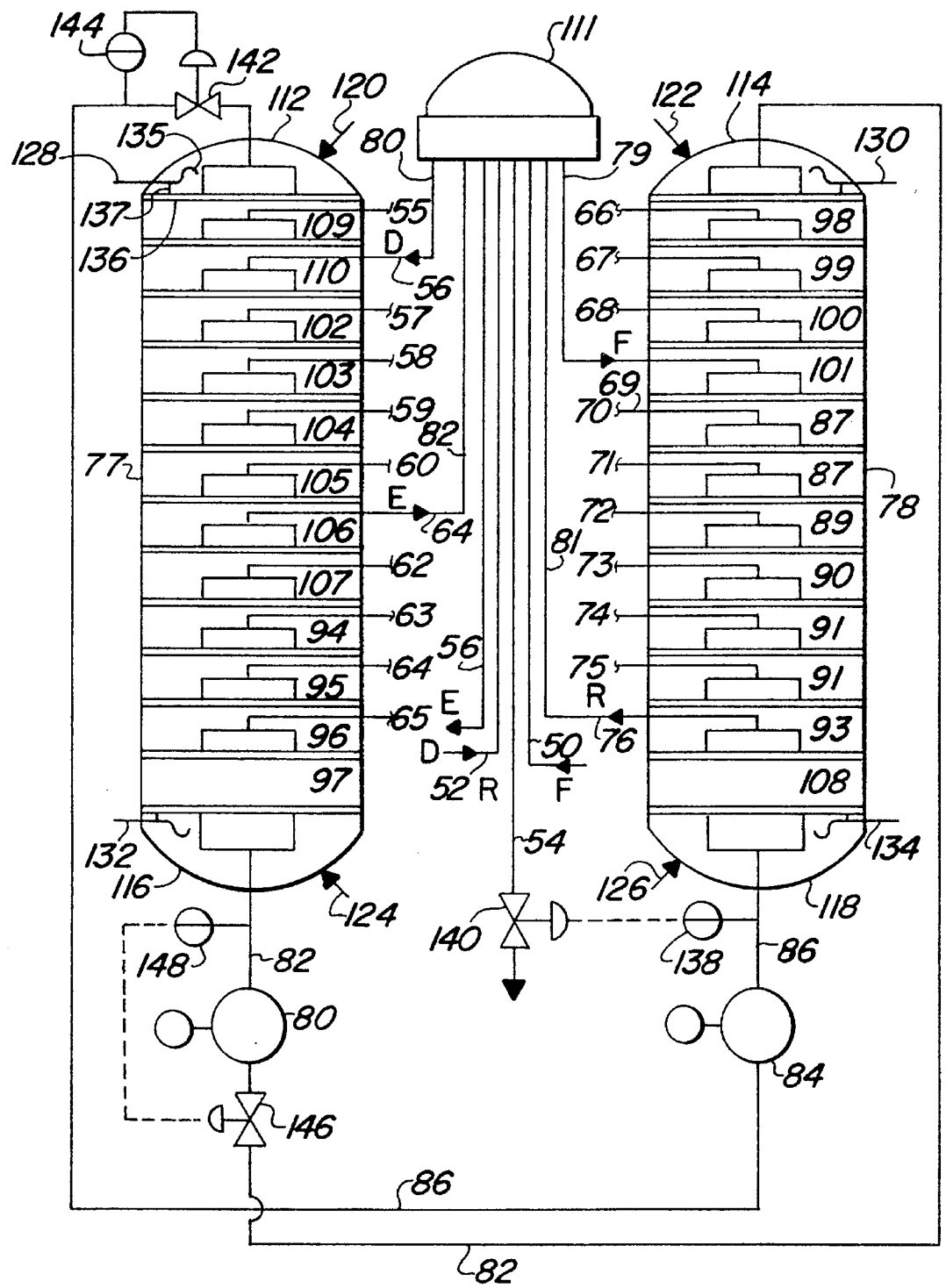
FIG. 3 is a schematic diagram of a simulated moving bed adsorption process.

FIG. 3 displays a general arrangement for a simulated moving bed adsorption process. The process sequentially contacts a feed stream 50 with adsorbent and a desorbent stream 52 to recover a raffinate stream 54 and an extract stream 56. These various streams include the following components and are used in the following manner.

A "feed stream" is a mixture containing one or more extract components and one or more raffinate components to be separated by the process.

An "extract component" is a compound or type of compound that is more selectively adsorbed by the adsorbent while a "raffinate component" is a compound or type of compound that is less selectively adsorbed. The term "desorbent material" shall mean generally a material capable of desorbing an extract component. The term "desorbent stream" indicates the stream through which desorbent material passes to the adsorbent. The term "raffinate stream" means a stream through which a raffinate component is removed from the adsorbent. The composition of the raffinate stream can vary from essentially 100% desorbent material to essentially 100% raffinate components. The term "extract stream" refers to a stream through which an extract material which has been desorbed by a desorbent material is removed from the adsorbent. The composition of the extract stream, likewise, can vary from essentially 100% desorbent material to essentially 100% extract components. At least a portion of the extract stream and preferably, at least a portion of the raffinate stream from the separation process are passed to separation means, typically fractionators, where at least a portion of desorbent material is separated to produce an extract product and a raffinate product. The terms "extract product" and "raffinate product" mean products produced by the process containing, respectively, an extract component and a raffinate component in higher concentrations than those found in the extract stream and the raffinate stream.

Relative selectivity can be expressed not only for one feed compound as compared to another but can also be expressed between any feed mixture component and the desorbent material. The selectivity is defined as the ratio of the two components in the adsorbed phase over the ratio of the same two components in the unadsorbed phase at equilibrium conditions. Relative selectivity is shown below.

$$\text{Selectivity} = \frac{[\text{wt. percent } C/\text{wt. percent } D]_A}{[\text{wt. percent } C/\text{wt. percent } D]_U}$$

where C and D are two components of the feed represented in weight percent and the subscripts A and U represent the adsorbed and unadsorbed phases, respectively. The equilibrium conditions are determined when the feed passing over a bed of adsorbent does not change composition after contacting the bed of adsorbent, in other words, there is no net transfer of material occurring between the unadsorbed and adsorbed phases. Where selectivity of two components approaches 1.0, there is no preferential adsorption of one component by the adsorbent with respect to the other; they are both adsorbed (or nonadsorbed) to about the same degree with respect to each other. As the selectivity becomes less than or greater than 1.0, there is a preferential adsorption by the adsorbent for one component with resect to the other. When comparing the selectivity by the adsorbent of one component C over component D, a selectivity larger than 1.0 indicates preferential adsorption of component C within the adsorbent. A selectivity less than 1.0 would indicate that component D is preferentially adsorbed leaving an unadsorbed phase richer in component C and an adsorbed phase richer in component C and an adsorbed phase richer in component D. Ideally, desorbent materials should have a selectivity equal to about 1 or slightly less than 1 with resect to all extract components so that all of the extract components can be desorbed as a class with reasonable flow rates of desorbent material, and so that extract components can displace desorbent material in a subsequent adsorption step.

Desorbent materials used in various prior an adsorptive separation processes may vary depending upon the type of operation employed. In the swing bed system, in which the selectively adsorbed feed component is removed from the adsorbent by a purge stream, desorbent selection is not as critical and desorbent material comprising gaseous hydrocarbons such as methane, ethane, etc., or other types of gases such as nitrogen or hydrogen, may be used at elevated temperatures or reduced pressures or both to effectively purge the adsorbed feed component from the adsorbent. However, in adsorptive separation processes which are generally operated continuously at substantially constant pressures and temperatures to insure liquid phase, the desorbent material must be judiciously selected to satisfy many criteria.

Since both the raffinate stream and the extract stream typically contain desorbent materials, desorbent materials should additionally be substances which are easily separable from the feed mixture that is passed into the process. Without a method of separating at least a portion of the desorbent material present in the extract stream and the raffinate stream, the concentration of an extract component in the extract product and the concentration of a raffinate component in the raffinate product would not be very high, nor would the desorbent material be available for reuse in the process.

Countercurrent moving bed or simulated moving bed countercurrent flow systems have a much greater separation efficiency than fixed adsorbent bed systems. In the moving bed or simulated moving bed processes, the adsorption and desorption operations are continuously taking place which allows both continuous production of an extract and a raffinate stream and the continual use of feed and desorbent streams. One preferred embodiment of this process utilizes what is known in the art as the simulated moving bed countercurrent flow system. The operating principles and sequence of such a flow system are described in U.S. Pat. No. 2,985,589. In such a system, it is the progressive movement of multiple liquid access points down an adsorbent chamber that simulates the upward movement of adsorbent contained in the chamber. These access points are numbered 55–65 along an adsorbent vessel 77 and 66–76 along an adsorbent vessel 70. The access points each communicate with adsorbent chambers through a pipe manifold similar to that described in FIGS. 1 or 2. Only four of the access lines are active at any one time: the feed input stream 79, desorbent inlet stream 80, raffinate outlet stream 81, and extract outlet stream 82 access lines. Coincident with this simulated upward movement of the solid adsorbent is the movement of the liquid occupying the void volume of the packed bed of adsorbent. So that countercurrent contact is maintained, a liquid flow down the adsorbent chamber 78 is provided by a pump 80 and interconnecting line 82. Likewise, pump 89 and interconnecting line 86 maintain liquid flow from vessel 75 to vessel 77. As an active liquid access point moves through a cycle, that is, from the top of the chamber to the bottom, the chamber circulation pump moves liquid through different zones which require different flow rates. A programmed flow controller may be provided to set and regulate these flow rates.

The active liquid access points effectively divide the adsorbent chamber into separate zones, each of which has a different function. In this embodiment of the present process, it is generally necessary that three separate operational zones be present in order for the process to take place, and in some instances, as described more fully in conjunction with FIG. 3, an optional fourth zone may be used.

The adsorption zone, zone 1, is defined as the adsorbent located between the feed inlet stream and the raffinate outlet stream. At a selected stage of operation, adsorbent beds 87–93 contain the total adsorbent of zone 1. In this zone, the feedstock contacts the adsorbent, an extract component is adsorbed, and a raffinate stream is withdrawn. The general flow through zone 1 is from the feed stream which passes into the zone to the raffinate stream which passes out of the zone, this is considered to be a downstream direction.

Immediately upstream, with respect to fluid flow in zone 1, is the purification zone, zone 2. The purification zone is defined as the adsorbent between the extract outlet stream and the feed inlet stream; i.e., for the selected stage of operation the purification zone corresponds to the adsorbent contained in adsorbent beds 94–101. The basic operations taking place in zone 2 are the displacement from the nonselective void volume of the adsorbent of any raffinate material carried into zone 2 by the shifting of adsorbent into this zone and the desorption of any raffinate material adsorbed within the selective pore volume of the adsorbent or adsorbed on the surfaces of the adsorbent particles. Purification is achieved by passing a portion of extract stream material leaving a zone 3 into zone 2 at zone 2's upstream boundary to effect the displacement of raffinate material. The flow of material in zone 2 is in a downstream direction.

Immediately upstream of zone 2 with respect to the fluid flowing in zone 2 is the desorption zone or zone 3. The desorption zone is defined by (again for this stage of operation by adsorbent beds 102–107) as the adsorbent between the desorbent inlet and the extract outlet streams. The desorbent zone passes a desorbent material into this zone to displace the adsorbed extract component which was adsorbed upon the adsorbent by previous contact with feed in zone 1 during a prior cycle of operation. Fluid flows downstream in zone 3.

A buffer zone 4, defined as the adsorbent between the raffinate outlet stream and the desorbent inlet stream and occupying adsorbent beds 108–110 at the selected stage of operation depicted in FIG. 3. Zone 4 conserves the amount of desorbent utilized in the desorption step since a portion of the raffinate stream, removed from zone 1, can be passed into zone 4 to displace desorbent material present in that zone out of that zone into the desorption zone. Zone 4 contains enough adsorbent to prevent raffinate from passing into zone 3 thereby contaminating the extract stream removed from zone 3.

The adsorbent beds defining each adsorption zone shift with each step in a complete adsorption cycle. The cyclic advancement of the input and output streams through the access points to simulate adsorbent movement in a countercurrent direction can be accomplished by many suitable valve arrangements. FIG. 3 shows a rotary disc type valve 111 to effect the simulated countercurrent flow of solid adsorbent with respect to fluid flow. Rotary disc valves for the simulated moving bed process can be found in U.S. Pat. Nos. 3,040,777 and 3,422,848.

Total flows into and out of the pressure vessels are controlled by a series of valves actuated by flow rate or pressure measurements. Input and output streams to the system, with the exception of the raffinate stream, operate on flow rate control through a series of valves (not shown). The raffinate flow out of the system varies in response to a pressure recorder 138 that signals a control valve 140. Control valve 140 regulates the flow rate of the system in response to the pressure of the circulating fluid flow. Pump 84 supplies pressure differential to circulate the fluid flow through the vessel at a rate set by control valve 142 in response to flow recorder 144. Pump 80 supplies pressure differential to circulate the fluid flow through vessel 78. Control valve 146 acting in response to pressure recorder 148 regulates the flow from vessel 77 to vessel 78 to maintain the pressure of vessel 77.

FIG. 3 represents a typical configuration where the process uses multiple adsorption vessels. Adsorption vessels 77 and 78 have top heads 112, 114 and bottom heads 116, 118. A flush fluid comprising desorbent enters each of the heads through inlet points 120, 122, 124, and 126. Outlet points 128, 130, 132, and 134 in each head withdraw a flush stream from a flush manifold. The flush manifold 135 as shown in head 112 has a "J" shape at the end of a straight pipe section. A branch segment 137 communicates distribution/collection grid 136 with a midpoint of the manifold. The end of the "J" communicates with the interior of the head 112 in the manner previously described for the flush manifold configuration of FIG. 1. Flow controllers (not shown) flows to and from the inlets and outlets points of the heads. Normally this flow control balances fluid flow to prevent net flow into or out of the grid, but may be set to provide some net flow in the case of piping leaks or other process demands. Nevertheless the numerous head flushes, two for every vessel, do not add appreciably to the fluid circulating to adsorbent beds 109 or 98 so that the effective flow rate to these beds is managed to achieve maximum recovery or purity.

Since the amount of fluid circulated through the head is independent of the process fluid circulated through the system, the head flush can operate at high head flush rates. In most cases the head flush is set at a rate that will displace the volume of the flush chamber once in every step of the multi-step cycle.

What is claimed is:

1. A simulated moving bed adsorption process, the process utilising an apparatus comprising an adsorption vessel containing an adsorbent and a distribution grid, the distribution grid separating said vessel into an equalization chamber and an adsorption chamber, the adsorbent being disposed in the adsorption chamber, a partition disposed within the equalization chamber and subdividing a portion of the equalization chamber to form a head flush chamber the process comprising:

a) collecting or distributing a process flow stream through the distribution grid in the adsorption vessel;

b) passing a head flush fluid to the equalization chamber in the adsorption vessel;

c) establishing fluid communication between the equalization chamber and the distribution grid through the head flush chamber; and, d) withdrawing a flush chamber effluent comprising head flush fluid from the head flush chamber.

2. The process of claim 1 wherein the flow of head flush fluid into the equalization chamber and the withdrawal of the flush chamber effluent are flow controlled.

\* \* \* \* \*